ically for spring washers, and their application to various devices.

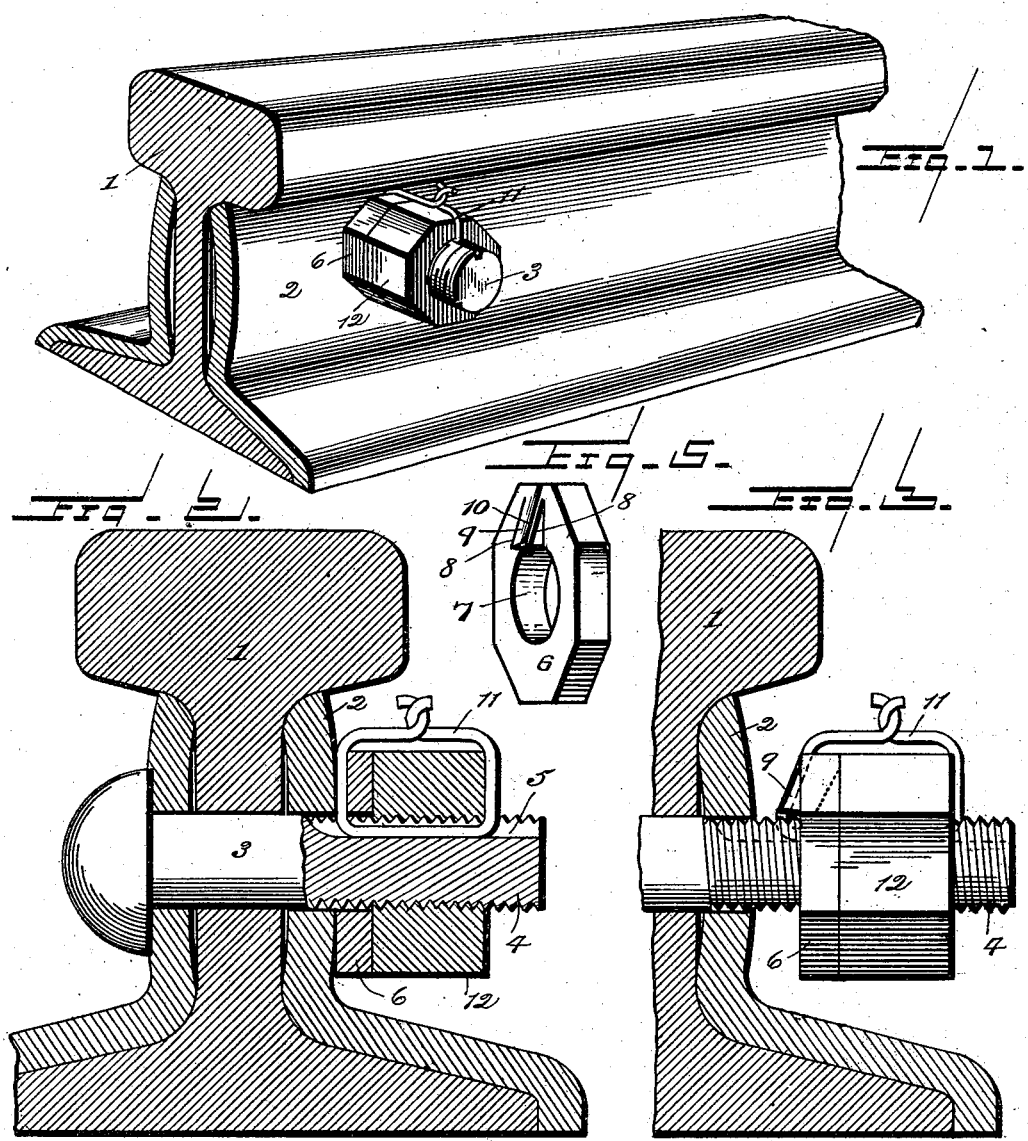

UNITED STATES PATENT OFFICE.

HENRY G. BUCH, OF OREGON, PENNSYLVANIA.

NUT-LOCK.

SPECIFICATION forming part of Letters Patent No. 723,821, dated March 31, 1903.

Application filed January 15, 1903. Serial No. 139,156. (No model.)

*To all whom it may concern:*

Be it known that I, HENRY G. BUCH, a citizen of the United States, residing at Oregon, in the county of Lancaster and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to nut-locks, and has for its object to provide a device for this purpose which is simple in its construction, easy of operation, and composed of a minimum number of parts.

A further object of my invention is to provide a device which is so constructed that should any wear occur in the device bolted the nut-lock will be more firmly secured on the bolt.

With these objects in view my invention consists in the novel construction of my washer, and particularly in combination with my locking-wire.

In the accompanying drawings, Figure 1 is a perspective view of part of the rail, showing my invention in an operative position. Fig. 2 is a transverse vertical section through the same. Fig. 3 is a view, partly in section, of my nut-lock, showing same locked on bolt away from fish-plate of rail. Fig. 4 is a perspective view of portion of bolt, washer, and locking-wire. Fig. 5 is a perspective view of washer with wire removed.

Like numerals of reference indicate the same parts throughout the several figures, in which—

1 is a rail, and 2 a fish-plate.

3 indicates the bolt, the threaded portion 4 thereof being provided with a longitudinal groove 5 the entire length thereof.

6 indicates a washer with the usual bore 7, said washer being provided with two parallel cuts 8, extending from said bore, and the material between said cuts is bent outwardly, forming the tang 9. The said tang is provided with a radial groove 10, within which the locking-wire 11 rests, so that the washer presents a flat face against the surface of the bolted device when the nut-lock is in position.

Having thus described the several parts of my invention, its operation is as follows: The washer and the locking-wire are run on the bolt, as shown in Fig. 4, the locking-wire entering the groove 5 in said bolt and being bent up into the radial groove in the washer. It is obvious that the said washer and locking-wire are capable of any longitudinal movement on the bolt; but the washer cannot revolve so long as the locking-wire is in its radial groove in said washer. The nut 12, which may be of any form, is then threaded on the bolt and against the washer and pressing the same firmly against the material being bolted until the projecting tang 9 is bent back into the washer and the entire rear face of said washer is even. When the nut has been threaded on the bolt as far as desired, the two ends of the locking-wire are brought together and twisted, as shown, which operation locks the nut and washer firmly and securely together and forms a strong and efficient nut-lock. Constant jarring or jolting, however, is liable to cause wear in the parts of the device which is bolted, or it is liable to cause a slight stretch in the locking-wire. In either case under ordinary circumstances there would be a tendency of the nut to unwind; but under the aforementioned conditions the projecting tang 9 would bear against the device, which is bolted, and take up any slight wear, and at the same time it would carry back that portion of the locking-wire which rests in its radial groove, which tightens the said wire, causing it to bind the nut and washer more firmly together, as shown in Fig. 3. It is of course understood that the washer should be made of spring metal.

Having thus described my invention, I do not wish to be understood as limiting myself to the exact construction herein set forth, as various slight changes may be made therein which would fall within the limit and scope of my invention, and I consider myself clearly entitled to all such changes and modifications.

What I claim as my invention, and desire to secure by Letters Patent of the United States, is—

1. In a nut-lock the combination of a nut, a bolt, provided with a longitudinal groove therein, a washer provided with a rearwardly-projecting spring-tang, and a radial groove in said tang, a locking-wire adapted to enter said longitudinal groove in said bolt, and said radial groove in said tang, the ends of said wire being adapted to be twisted together when said nut is in position, the whole arranged whereby said tang will cause said wire to bind said nut and washer firmly together.

2. In a nut-lock the combination of a nut, a bolt, a locking-wire, and a washer provided with a rearwardly-projecting spring-tang, adapted to bear against said wire, and bind said washer and nut together, after the ends of the said wire are twisted.

3. In a nut-lock the combination of a nut, a bolt, and a washer, said bolt being provided with a longitudinal groove, and said washer being provided with a radial groove, a locking-wire adapted to enter said grooves, and its ends twisted together around said nut and washer and means on said washer for tightening said wire after the same is twisted.

In testimony whereof I affix my signature in presence of two witnesses.

HENRY G. BUCH.

Witnesses:
RAYMOND G. RUTTER,
JNO. B. MILLER.